(12) United States Patent
Coombe

(10) Patent No.: US 9,092,900 B2
(45) Date of Patent: Jul. 28, 2015

(54) TERRAIN-BASED VIRTUAL CAMERA TILTING, AND APPLICATIONS THEREOF

(75) Inventor: Greg Coombe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 377 days.

(21) Appl. No.: 13/534,806

(22) Filed: Jun. 27, 2012

(65) Prior Publication Data

US 2014/0118495 A1    May 1, 2014

Related U.S. Application Data

(60) Provisional application No. 61/655,892, filed on Jun. 5, 2012.

(51) Int. Cl.
*H04N 13/02* (2006.01)
*G06T 17/05* (2011.01)
*G06T 19/00* (2011.01)

(52) U.S. Cl.
CPC ............... *G06T 17/05* (2013.01); *G06T 19/003* (2013.01)

(58) Field of Classification Search
CPC .. H04N 13/02; G06F 3/04815; G06T 19/003; G06T 15/20; G06T 15/00; G06T 17/05
See application file for complete search history.

(56) References Cited

U.S. PATENT DOCUMENTS

| | | | |
|---|---|---|---|
| 8,749,550 B1 * | 6/2014 | Strauss et al. | 345/419 |
| 8,847,949 B1 * | 9/2014 | Strauss et al. | 345/419 |
| 2009/0256840 A1 * | 10/2009 | Varadhan et al. | 345/419 |
| 2009/0259976 A1 * | 10/2009 | Varadhan et al. | 715/850 |
| 2010/0053219 A1 * | 3/2010 | Kornmann | 345/653 |

* cited by examiner

*Primary Examiner* — Christopher S Kelley
*Assistant Examiner* — Deirdre Beasley
(74) *Attorney, Agent, or Firm* — Dority & Manning, P.A.

(57) ABSTRACT

Embodiments alter the swoop trajectory depending on the terrain within the view of the virtual camera. To swoop into a target, a virtual camera may be positioned at an angle relative to the upward normal vector from the target. That angle may be referred to as a tilt angle. According to embodiments, the tilt angle may increase more quickly in areas of high terrain variance (e.g., mountains or cities with tall buildings) than in areas with less terrain variance (e.g., flat plains). To determine the level of terrain variance in an area, embodiments may weigh terrain data having higher detail more heavily than terrain data having less detail.

11 Claims, 6 Drawing Sheets

TERRAIN-BASED VIRTUAL CAMERA TILTING, AND APPLICATIONS THEREOF

This application claims priority to U.S. Patent Application No. 61/655,892 filed Jun. 5, 2012, which is incorporated by reference herein in its entirety.

BACKGROUND

1. Field

This field relates to navigating in a three-dimensional environment.

2. Related Art

Systems exist for navigating through a three-dimensional environment to display three-dimensional data. The three-dimensional environment includes a virtual camera that defines what three-dimensional data to display. The virtual camera has a perspective according to its position and orientation. By changing the perspective of the virtual camera, a user can navigate through the three-dimensional environment.

A geographic information system is one type of system that uses a virtual camera to navigate through a three-dimensional environment. A geographic information system is a system for storing, retrieving, manipulating, and displaying a substantially spherical three-dimensional model of the Earth. The three-dimensional model may include satellite images texture mapped to terrain, such as mountains, valleys and canyons.

The virtual camera in the geographic information system may view the spherical three-dimensional model of the Earth from different perspectives. An aerial perspective of the model of the Earth may show satellite images, but the terrain may be difficult to see. On the other hand, a ground-level perspective of the model may show the terrain in detail.

To transition from an aerial perspective to a ground level perspective, U.S. Patent Application Publication No. 2009/0259976 by Varadhan et al. describes an example method of swooping between perspectives. Varadhan describes reducing a distance between the virtual camera and the target and determining a tilt value based on the reduced distance. Then, the virtual camera is positioned according to the tilt value and the reduced distance.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1A-B are diagrams illustrating variation of a swoop trajectory according to terrain within the view of the virtual camera, according to an embodiment.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

As mentioned above, a method exists for swoop navigation. However, in cases where the terrain is flat, a perspective that is parallel for ground may be less interesting to a user than in cases where the terrain varies in altitude. Thus, applying a single swoop trajectory to an entire three-dimensional environment that includes both flat and rugged terrain may lead to situations where the swoop trajectory does not provide an optimal user experience.

To deal with variations in terrain, embodiments alter the swoop trajectory depending on the terrain within the view of the virtual camera. To swoop into a target, a virtual camera may be positioned at an angle relative to the upward normal vector from the target. That angle may be referred to as a tilt angle. According to embodiments, the tilt angle may increase more quickly in areas of high terrain variance (e.g., mountains or cities with tall buildings) than in areas with less terrain variance (e.g., flat plains). To determine the level of terrain variance in an area, embodiments may weigh terrain data having higher detail more heavily than terrain data having less detail. These and other embodiments are described in more detail below. The tilt angle may also be varied based on the amount of terrain variance even if the camera is otherwise static, and/or the tile angle may be varied during another maneuver other than a swoop (e.g., when simply zooming in or out from one position or while moving along some other trajectory).

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1A:
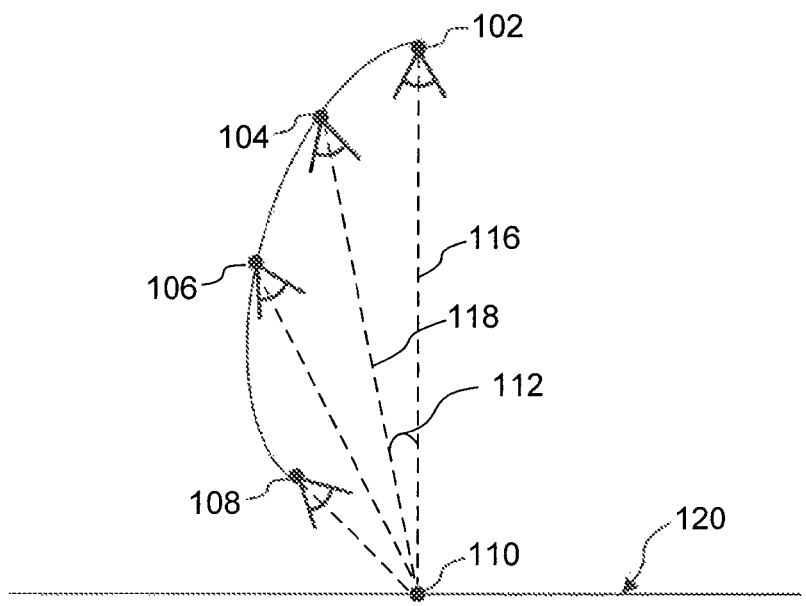
Figure 1B:
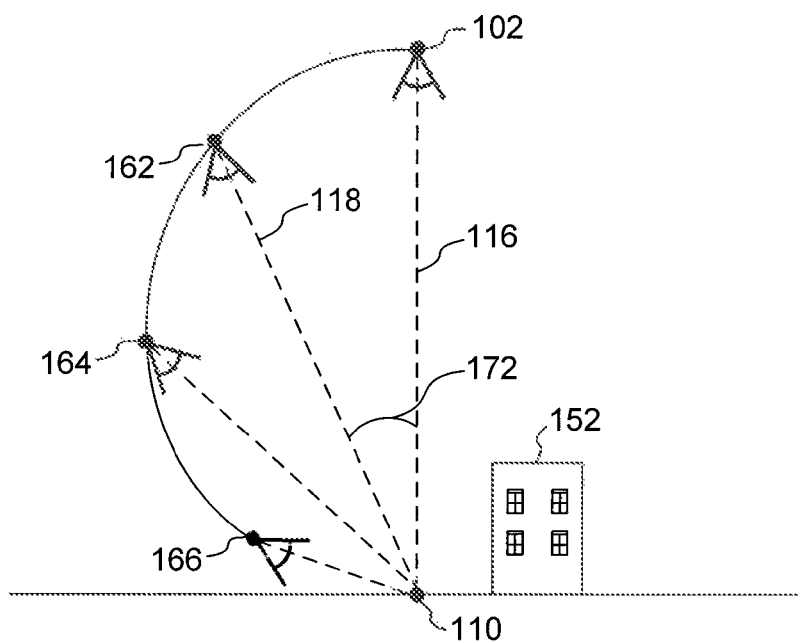

FIGS. 1A-B show diagrams illustrating variation of a swoop trajectory according to terrain within the view of the virtual camera. FIG. 1A shows a diagram 100 illustrating a simple swoop trajectory. Diagram 100 shows a virtual camera at a location 102. At location 102, the virtual camera has an aerial perspective. In the example shown, the user wishes to navigate from the aerial perspective to a ground-level perspective of a flat area 120. At location 102, the virtual camera is oriented straight down, therefore its tilt is zero, and the virtual camera is a distance 116 from a target 110.

To determine the next position on the swoop trajectory, distance 116 is reduced to determine a new distance 118. In the example shown, the distance between the virtual camera and the target is reduced. A tilt 112 is also determined. Tilt 112 is an angle between a vector directed upwards from target 110 and a line segment connecting location 104 and target 110. Tilt 112 may be determined according to reduced distance 118. The camera's next position on the swoop trajectory corresponds to tilt 112 and reduced distance 118. The camera is repositioned to a location 104. Location 104 is distance 118 away from target 110. Finally, the camera may be rotated by tilt 112 to face target 110.

The process is repeated to move the virtual camera to a position 106 and then to a position 108. In an embodiment, the process may be repeated until the distance between the virtual camera and target 110 is below a threshold. In this way, diagram 100 illustrates a swoop trajectory to view flat area 120.

While the swoop trajectory in diagram 100 may be advantageous to view flat area 120, FIG. 1B illustrates an area that is not flat. In particular, FIG. 1B shows a diagram 150 that has a building 152. Because the area illustrated in diagram 150 illustrates features having more variation in altitude than area 120, a tilt angle that is more obtuse may provide views that are more interesting to a user.

In diagram 150, the virtual camera begins at the same position 102 and is swooping toward the same target 110 as in diagram 100. However, because the area viewed by the virtual camera includes more variation in altitude, the tilt angle increases more quickly.

Just as in diagram 100, in diagram 150, distance 116 is reduced to distance 118 to determine the next position on the swoop trajectory. Based on both distance 118 and the variations within the view of the virtual camera, a tilt 172 is determined. Even though distance 118 is the same in both diagrams 100 and 150, the determined tilt angles 112 and 172 are different due to the different levels of variation in terrain. Based on distance 118 and tilt 172, the virtual camera is moved to a new position 162. Specifically, position 162 is distance 118 away from target 110 and the angle between an upward normal ray and a line segment connecting target 110 and position 162 is set to the tilt 172. With the camera set to position 162, the camera may be rotated to target 110.

The process is repeated to move the virtual camera to a position 164 and then to a position 166. In an embodiment, the process may be repeated until the distance between and virtual camera and target 110 is below a threshold. In this way, FIGS. 1A and B illustrate two different swoop trajectories that vary according to the variation in terrain within a view of the virtual camera.

Figure 2:
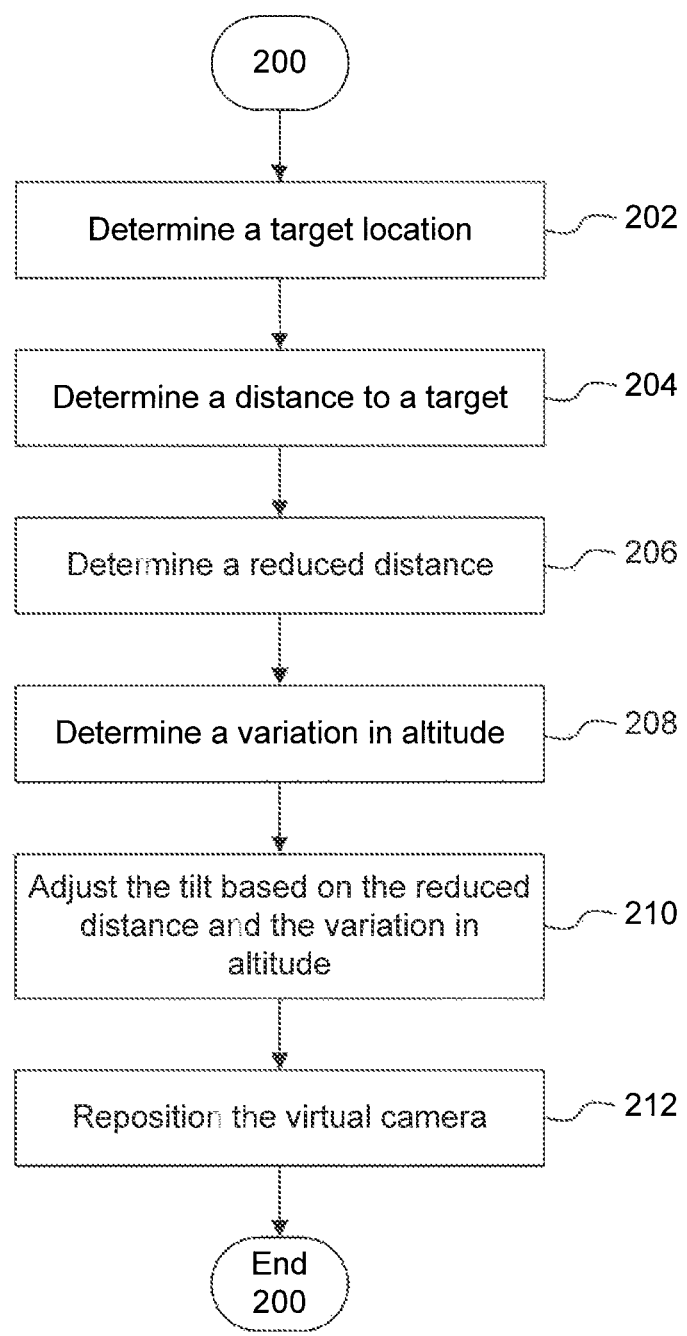
FIG. 2 is a flowchart illustrating a method for terrain-based swoop navigation, according to an embodiment.

FIG. 2 is a flowchart illustrating a method 200 for terrain-based swoop navigation, according to an embodiment. Method 200 may be executed to re-position the virtual camera for each frame during the swoop navigation maneuver. Method 200 begins at step 202.

At step 202, a target is determined. The target may be determined according to a user selection on a display viewport. Based on the position selected on the viewport, a ray may be extended. The ray may be extended from a focal point of the virtual camera and according the focal length of the virtual camera. The target may be determined to be at an intersection of the ray and a three-dimensional model within the three-dimensional environment. The entire three-dimensional model, with complete detail, may be too large to be initially downloaded. For this reason, the three-dimensional model may be downloaded and presented in increasing detail as the virtual camera gets closer to the target. Because the three-dimensional model may change as the virtual camera gets closer to the target, the intersection between the ray and the three-dimensional model may also change. For that reason, the target location may need to be recalculated at each frame of the swoop trajectory.

Once the target location is determined at step 202, a distance between the target and the virtual camera is determined at step 204. Then, at step 206, the distance is reduced. In an example, the distance may be reduced logarithmically. At high aerial distances, there may not be as much data of interest to a user. However, as the camera gets closer to the ground, there may be more data that is of interest to a user. A logarithmic function is useful because it moves the virtual camera through the high aerial portion of the swoop trajectory quickly. However, a logarithmic function moves the virtual camera more slowly as it approaches the ground. In this way, a reduced distance may be determined at step 206.

At step 208, a variation in the altitude of geographic data within the view of the virtual camera may be determined. The variation in altitude may be determined, for example, by determining the highest and lowest points in the view of the virtual camera and taking the difference. However, this approach may lead to two problems.

First, users are generally more interested in foreground objects than in background objects. For example, a distant mountain may be within view of the virtual camera, but the foreground may only include small buildings and houses. In that example, the tilt should be adjusted more heavily based on the shorter foreground objects than the more distant background objects.

Second, as mentioned above, the terrain data may be loaded incrementally at varying levels of detail. Initially, the terrain data representing a mountain may not be present in the client system. However, as the virtual camera is closer, the mountain terrain data may be downloaded from a server. When the mountain terrain data is downloaded, the variation altitude, and hence the rate at which the camera tilts, could change rapidly. This rapid change may not create a pleasing user experience. In the face of changing terrain data, the tilt value should change gradually and smoothly. At least in part to deal with these issues, the variation in altitude for the areas having greater detail may be weighted more heavily than the variation in altitude for the areas having lesser detail. This is illustrated, for example, in FIGS. 3-4.

FIG. 2 discussed adjusting tilt during a swoop transition. Of course, in other embodiments the tilt may be adjusted while another transition is in progress or when the camera is otherwise static (e.g., after a zoom or other transition is complete). In one such example, a method begins at step 208 in response to an event that specifies change in view of the virtual camera. The variation in altitude is determined and then the camera tilt is adjusted accordingly.

Figure 3:
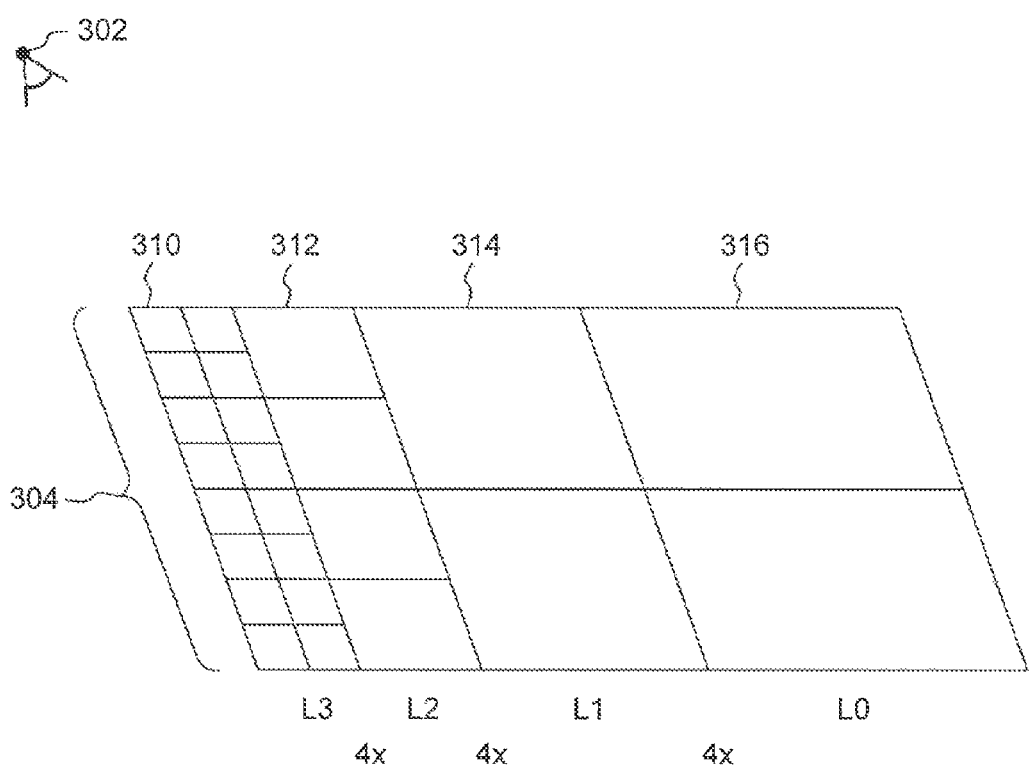
FIG. 3 is a diagram illustrating a plurality of nodes having varying levels of detail within a view of a virtual camera.

FIG. 3 is a diagram 300 illustrating an area 304 within view of a virtual camera 302. Area 304 shows a plurality of nodes having varying levels of detail. Each node may describe geographic data, including terrain data, within a particular area. The particular area may be a lat/long square. Terrain data, as the term is used herein, may include three-dimensional models of both natural objects (such as mountains, valleys, rivers, lakes, trees, etc.) and man-made objects (such as buildings, monuments, etc.). Nodes closer to the virtual camera describe geographic data in more detail, but cover a smaller geographic area.

Specifically, diagram 300 illustrates a quad node tree structure. In a quad node tree structure, at each decreasing level in the quad node tree structure, the nodes cover a geographic area four times larger than the previous level, but with four times less detail. For example, area 304 includes nodes 310, 312, 314, and 316. In an illustrative example, node 310 may be at a level L3 in the quad node tree structure; node 312 may be at a level L2; node 314 may be at a level L1; and node 316 may be at a level L0. Node 316 may cover four times the area as node 314, but at a quarter of the detail; node 314 may cover four times the area as node 312, but again at a quarter of the detail; and node 312 may cover four times the area as node 310, but once again at a quarter of the detail.

The altitude variation of each the nodes may be evaluated independently. For example, the variation in altitude of node 314 may be determined as illustrated in FIG. 4.

Figure 4:
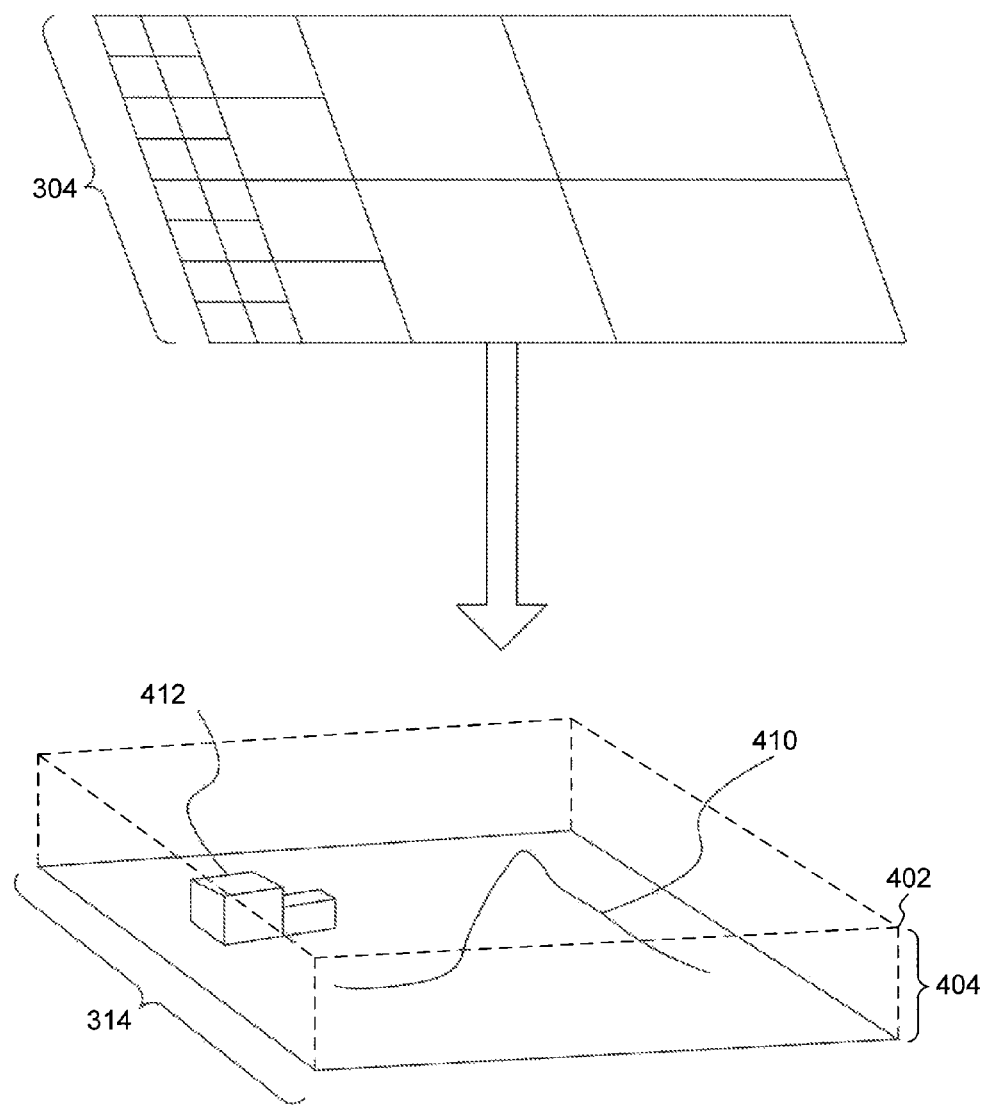
FIG. 4 is a diagram illustrating determination of a variation in altitude within a node.

FIG. 4 shows a diagram 400 illustrating determination of a variation in altitude within node 314. Node 314 includes terrain data representing multiple buildings 412 and mountain 410. To determine the variation altitude, a bounding box 402 around the terrain data may be determined. Determining a bounding box may be computationally inexpensive. The terrain data may include a plurality of (latitude, longitude, altitude) points. To determine bounding box 402, the plurality of points may be scanned to identify the minimum and maximum of each of the latitude, longitude, and altitude values. The six values—the minimum and maximum latitude, the minimum and maximum longitude, and the minimum and maximum altitude values—together describe bounding box 402. Once bounding box 402 is determined, the variation in altitude for node 314 may be determined by taking the difference between the maximum and minimum altitude values. This process is repeated for each node within the view of the virtual camera.

Once an altitude variation for each node is determined, a weighted average of those altitude variation values may be determined to create an altitude variation value for the entire view. The weights for the weighted average may correspond to varying levels of detail of the nodes. For example, nodes having greater detail (such as node 310 in FIG. 3) may be more heavily weighted than nodes having less detail (such as node 316). For example, the weight for node 310 may be four times greater than for node 312; the weight for node 312 may be four times greater than for node 314; and the weight for node 314 may be four times greater than for node 316. Also, to make small tall nodes (like buildings) count more than large flat nodes (like Kansas), the altitude variation values may be adjusted based on the extent of the area of the node covers.

In one example, the weighted average may be the weighted average of the ratio of the altitude difference for each node to the latitude and longitude extent of the node. In this example, the variation of altitude within the view may substantially satisfy the following equation:

$$V = \frac{\sum_{n=0}^{N} w_n \left( \frac{Alt_n^{max} - Alt_n^{min}}{\sqrt{(Lat_n^{max} - Lat_n^{min})(Long_n^{max} - Long_n^{min})}} \right)}{\sum_{n=0}^{N} w_n},$$

where V is the variation of altitude within the view,
$w_n$ is the weight of node n;
$Alt_n^{max}$ is the maximum altitude for node n (perhaps as determined using the bounding box)
$Alt_n^{max}$ is the minimum altitude for node n (perhaps as determined using the bounding box)
$Long_n^{max}$ is the maximum longitude for node n (perhaps as determined using the bounding box)
$Long_n^{min}$ is the minimum longitude for node n (perhaps as determined using the bounding box)
$Lat_n^{max}$ is the maximum latitude for the node (perhaps as determined using the bounding box)
$Lat_n^{min}$ is the minimum latitude for the node (perhaps as determined using the bounding box). Additionally, small offsets, coefficients, and exponents may also be included in the above equation to substantially satisfy it.

Referring back to FIG. 2, once the variation of altitude within the virtual camera's view is determined at step 208, the tilt value is adjusted based on the reduced distance and on the variation in altitude. The tilt value may be set using a tilt function. The tilt function may be defined such that the tilt value increases as the distance between the camera and a target decreases and as the variation altitude increases. In an example, an amount to change the tilt Δt may be determined based on the reduced distance or an amount by which the distance was reduced in step 206. That amount to change the tilt may be adjusted according to a tilt factor α. The tilt factor α may, in turn, be determined based on the variation in altitude. How to determine the tilt factor α based on the variation in altitude is illustrated in FIG. 5.

Figure 5:
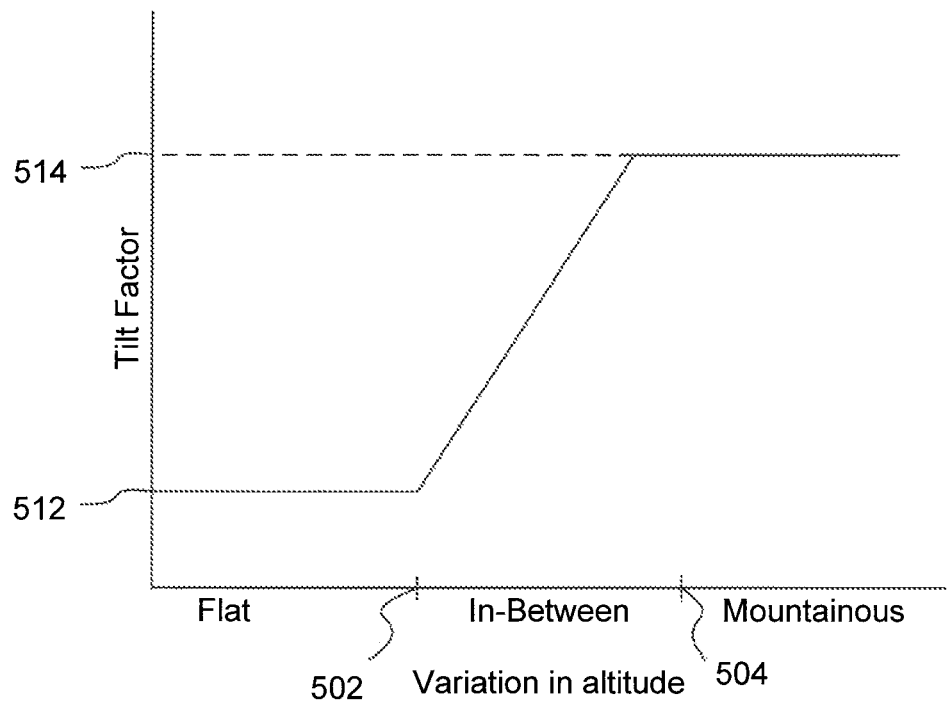
FIG. 5 is a chart illustrating how variations in altitude within a view of a virtual camera impact a tilt factor.

FIG. 5 shows a chart 500 illustrating how variations in altitude within a view of a virtual camera impact a tilt factor α. Chart 500 illustrates three possible scenarios for setting the tilt factor α:
when the variation in altitude V is less than a first threshold 502 (e.g., relatively flat), the tilt factor α is set to a first value 512,
when the variation in altitude V is greater than first threshold 502 and less than a second threshold 504, the tilt factor α is between first value 512 and a second value 514 and linearly corresponds to the variation in altitude of the content in the view, and
when the variation in altitude V is greater than second threshold 504 (e.g., mountainous or with tall buildings), the tilt factor α is set to second value 514.

Once the tilt factor α is determined based on the variation in altitude, the new tilt value for the virtual camera may be determined. For example, the new tilt value $t_{new}$ may be set according to the old tilt value $t_{old}$, the amount to change the tilt Δt determined based on the reduced distance, and the tilt factor α determined according to the variation in altitude within the view of the virtual camera: $t_{new} = t_{old} + \Delta t * \alpha$. In this way, the adjusted tilt may be determined based on the reduced distance and variation in altitude at step 210.

Once the adjusted tilt is determined in step 210, the virtual camera may be repositioned in the three-dimensional environment at step 212. The virtual camera may be repositioned based on the adjusted tilt determined in step 210 and the reduced distance determined in step 206. Specifically, the virtual camera may be positioned at a new location in the three-dimensional environment such that the reduced distance defines the distance between the target location and the virtual camera and the adjusted tilt defines an angle relative to an upward vector from the target location. Finally, the camera or the model may be rotated such that the target location appears at the same point on the camera's viewport.

Steps 202 through 212 may be repeated for each frame of the swoop trajectory. In this way, method 200 in FIG. 2 provides for terrain-based swoop navigation, according to an embodiment.

Figure 6:
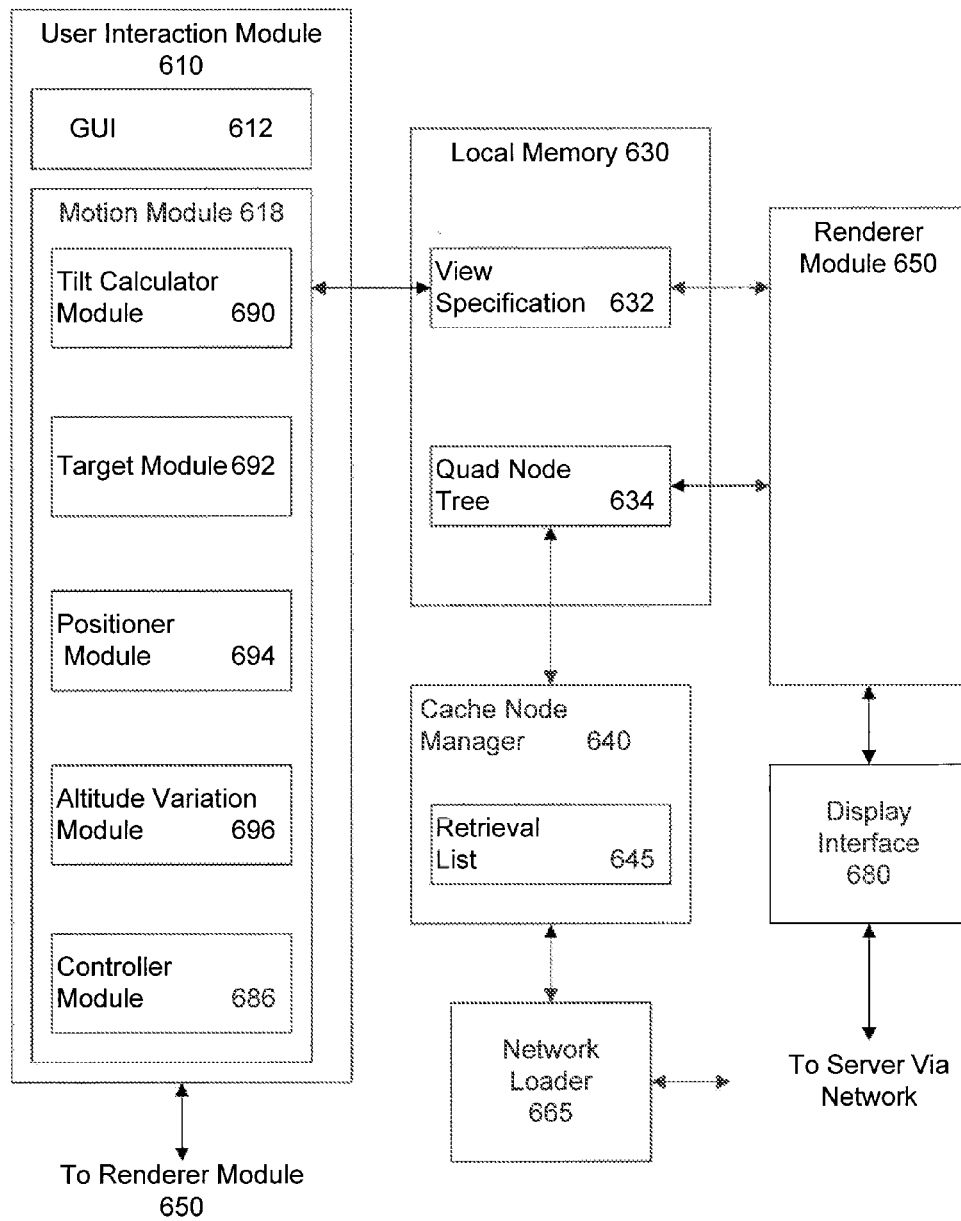
FIG. 6 is a diagram showing a geographic information system for terrain-based swoop navigation, according to an embodiment.

FIG. 6 is an architecture diagram of an exemplary GIS client 600 of a GIS according to an embodiment. In an embodiment, client 600 includes a user interaction module 610, local memory 630, cache node manager 640, renderer module 650, network loader 665, and display interface 680. As shown in FIG. 6, user interaction module 610 includes a graphical user interface (GUI) 612 and motion model 618. Local memory 630 includes a view specification 632 and quad node tree 634. Cache node manager 640 includes a retrieval list 645.

In an embodiment, the components of client 600 can be implemented, for example, as software running on a client machine. Client 600 interacts with a GIS server (not shown) to bring images of the Earth and other geospatial information/ data to client 600 for viewing by a user. Together, the images of the Earth and other geospatial data form a three-dimensional model in a three-dimensional environment. In an embodiment, software objects are grouped according to functions that can run asynchronously (e.g., time independently) from one another.

In general, client 600 operates as follows. User interaction module 610 receives user input regarding a location that a user desires to view and, through motion module 618, constructs view specification 632. Renderer module 650 uses view specification 632 to decide what data is to be drawn and draws the data. Cache node manager 640 runs in an asynchronous thread of control and builds a quad node tree 634 by populating it with quad nodes retrieved from a remote server via a network.

In an embodiment of user interaction module 610, a user inputs location information using GUI 612. This results, for example, in the generation of view specification 632. View specification 632 is placed in local memory 630, where it is used by renderer module 650.

Motion module 618 uses location information received via GUI 612 to adjust the position and/or orientation of a virtual camera. The camera is used, for example, for viewing a displayed three-dimensional model of the Earth. A user sees a displayed three-dimensional model on his or her computer monitor from the standpoint of the virtual camera. In an embodiment, motion module 618 also determines view specification 632 based on the position of the virtual camera, the orientation of the virtual camera, and the horizontal and vertical fields of view of the virtual camera.

View specification 632 defines the virtual camera's viewable volume within a three-dimensional space, known as a frustum, and the position and orientation of the frustum with respect, for example, to a three-dimensional map. In an embodiment, the frustum is in the shape of a truncated pyramid. The frustum has minimum and maximum view distances that can change depending on the viewing circumstances. As a user's view of a three-dimensional map is manipulated using GUI 612, the orientation and position of the frustum changes with respect to the three-dimensional map. Thus, as user input is received, view specification 632 changes. View specification 632 is placed in local memory 630, where it is used by renderer module 650.

In accordance with one embodiment of the present invention, view specification 632 specifies three main parameter sets for the virtual camera: the camera tripod, the camera lens, and the camera focus capability. The camera tripod parameter set specifies the following: the virtual camera position: X, Y, Z (three coordinates); which way the virtual camera is oriented relative to a default orientation, such as heading angle (e.g., north?, south?, in-between?); pitch (e.g., level?, down?, up?, in-between?); and yaw/roll (e.g., level?, clockwise?, anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In one example operation, and with the above camera parameters in mind, assume the user presses the left-arrow (or right-arrow) key. This would signal to motion module 618 that the view should move left (or right). Motion model 618 implements such a ground level "pan the camera" type of control by adding (or subtracting) a small value (e.g., 1 degree per arrow key press) to the heading angle. Similarly, to move the virtual camera forward, the motion module 618 would change the X, Y, Z coordinates of the virtual camera's position by first computing a unit-length vector along the view direction (HPR) and adding the X, Y, Z sub-components of this vector to the camera's position after scaling each sub-component by the desired speed of motion. In these and similar ways, motion module 618 adjusts view specification 632 by incrementally updating XYZ and HPR to define the "just after a move" new view position. In this way, motion module 618 is responsible for navigating the virtual camera through the three-dimensional environment.

Motion module 618 also conducts processing for swoop navigation. For swoop navigation processing, motion module 618 includes several sub modules—a tilt calculator module 690, target module 692, positioner module 694, altitude variation module 696, and controller module 686. Controller module 686 activates the sub-modules to control the swoop navigation.

Target module 692 determines a target. In an embodiment, target module 692 may operate as described to FIGS. 4-5. Target module 692 determines the target by first extending a ray from a focal point of the virtual camera through a point selected by a user. Then, target module 692 determines an intersection between the ray and a three-dimensional model as stored in quad node tree 634. Finally, target module 692 determines a target in the three-dimensional model at the intersection.

Altitude variation module 696 determines a variation in the altitude of geographic data within the view of the virtual camera as described above with respect to step 208 in FIG. 2. In an embodiment, altitude variation module 696 determines the variation in altitude by determining the highest and lowest points in the view of the virtual camera and taking the difference. In another embodiment, altitude variation module 696 first determines an altitude variation for each node within the view of the virtual camera. Next, altitude variation module 696 determines an altitude variation for a node by using a bounding box that encompasses the geographic data in the region of the node. Then, altitude variation module 696 determines the variation in the altitude of geographic data within the view of the virtual camera by calculating a weighted average of those altitude variation values within all nodes. In yet another embodiment, the weighted average may be the weighted average of the ratio of the altitude difference for each node to the latitude and longitude extent of the node.

Tilt calculator module 690 updates the distance and tilt values as described above with respect to steps 204-206, and step 210 in FIG. 2. First, tilt calculator module 690 determines a distance between the target and the virtual camera. Next, tilt calculator module 690 reduces the distance. In an embodiment, tilt calculator module 690 may reduce the distance logarithmically to provide a smooth and pleasing user experience. Finally, after altitude variation module 696 determines the variation in the altitude of geographic data within the view of the virtual camera, tilt calculator module 690 adjusts the tilt value based on the reduced distance and the variation in the altitude. In another embodiment, tilt calculator module 690 may adjust the amount to change the tilt according to a tilt factor $\alpha$, which, in turn, is determined based on the variation in altitude.

When activated, positioner module 694 repositions the virtual camera according to the target location determined by target module 692 and the tilt and the reduced distance determined by tilt calculator module 690. Positioner module 694 may be activated, for example, by a function call. Positioner module 694 may reposition the virtual camera by translating the virtual camera into the target, angling the virtual camera to match the tilt, and translating the virtual camera away from the target by the reduced distance. In one example, positioner module 694 may operate as described with respect to step 212 on FIG. 2.

As positioner module 694 moves the virtual camera closer to the model of the Earth, renderer module 650 requires more detailed model data, including terrain data. A request for more detailed geographic data is sent from cache node manager 640 to the GIS server. The GIS server streams the more detailed geographic data, including terrain data back to GIS client 600. Cache node manager 640 saves the more detailed geographic data in quad node tree 634. Thus, effectively, the model of the Earth stored in quad node tree 634 changes. When it determined the location of the target, target module 692 used the previous model in quad node tree 634. For this reason, target module 692 may have to adjust the location of the target.

Renderer module 650 has cycles corresponding to the display device's video refresh rate (e.g., 60 cycles per second). In one particular embodiment, renderer module 650 performs a cycle of (i) waking up, (ii) reading the view specification 632 that has been placed by motion module 618 in a data structure accessed by a renderer, (iii) traversing quad node tree 634 in local memory 630, and (iv) drawing drawable data contained in the quad nodes residing in quad node tree 634. The drawable data may be associated with a bounding box (e.g., a volume that contains the data or other such identifier). If present, the bounding box is inspected to see if the drawable data is potentially visible within view specification 632. Potentially visible data is drawn, while data known not to be visible is ignored. Thus, the renderer uses view specification 632 to determine whether the drawable payload of a quad node resident in quad node tree 634 is not to be drawn, as will now be more fully explained.

Initially, and in accordance with one embodiment of the present invention, there is no data within quad node tree 634 to draw, and renderer module 650 draws a star field by default (or other suitable default display imagery). Quad node tree 634 is the data source for the drawing that renderer module 650 does except for this star field. Renderer module 650 traverses quad node tree 634 by attempting to access each quad node resident in quad node tree 634. Each quad node is a data structure that has up to four references and an optional payload of data. If a quad node's payload is drawable data, renderer module 650 will compare the bounding box of the payload (if any) against view specification 632, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, renderer module 650 also attempts to access each of the up to four references in the quad node. If a reference is to another quad node in local memory (e.g., memory 630 or other local memory), renderer module 650 will attempt to access any drawable data in that other quad node and also potentially attempt to access any of the up to four references in that other quad node. The renderer module's attempts to access each of the up to four references of a quad node are detected by the quad node itself.

As previously explained, a quad node is a data structure that may have a payload of data and up to four references to other files, each of which in turn may be a quad node. The files referenced by a quad node are referred to herein as the children of that quad node, and the referencing quad node is referred to herein as the parent. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., on server(s) of the GIS), and there is no drawable data present on the user's computer.

Quad nodes and cache nodes have built-in accessor functions. As previously explained, the renderer module's attempts to access each of the up to four references of a quad node are detected by the quad node itself. Upon the renderer module's attempt to access a child quad node that has a filename but no corresponding address, the parent quad node places (e.g., by operation of its accessor function) that filename onto a cache node retrieval list 645. The cache node retrieval list comprises a list of information identifying cache nodes to be downloaded from a GIS server. If a child of a quad node has a local address that is not null, the renderer module 650 uses that address in local memory 630 to access the child quad node.

Quad nodes are configured so that those with drawable payloads may include within their payload a bounding box or other location identifier. Renderer module 650 performs a view frustum cull, which compares the bounding box/location identifier of the quad node payload (if present) with view specification 632. If the bounding box is completely disjoint from view specification 632 (e.g., none of the drawable data is within the frustum), the payload of drawable data will not be drawn, even though it was already retrieved from a GIS server and stored on the user's computer. Otherwise, the drawable data is drawn.

The view frustum cull determines whether or not the bounding box (if any) of the quad node payload is completely disjoint from view specification 632 before renderer module 650 traverses the children of that quad node. If the bounding box of the quad node is completely disjoint from view specification 632, renderer module 650 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from view specification 632.

Quad node and cache node payloads may contain data of various types. For example, cache node payloads can contain satellite images, text labels, political boundaries, 3 dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent.

The cache node manager 640 thread, and each of one or more network loader 665 threads, operate asynchronously from renderer module 650 and user interaction module 610. Renderer module 650 and user interaction module 610 can also operate asynchronously from each other. In some embodiments, as many as eight network loader 665 threads are independently executed, each operating asynchronously from renderer module 650 and user interaction module 610. The cache node manager 640 thread builds quad node tree 634 in local memory 630 by populating it with quad nodes retrieved from GIS server(s). Quad node tree 634 begins with a root node when the client system is launched or otherwise started. The root node contains a filename (but no corresponding address) and no data payload. As previously described, this root node uses a built-in accessor function to self-report to the cache node retrieval list 645 after it has been traversed by renderer module 650 for the first time.

In each network loader 665 thread, a network loader traverses the cache node retrieval list 645 (which in the embodiment shown in FIG. 6 is included in cache node manager 640, but can also be located in other places, such as the local memory 630 or other storage facility) and requests the next cache node from the GIS server(s) using the cache node's filename. The network loader only requests files that appear on the cache node retrieval list. Cache node manager 640 allocates space in local memory 630 (or other suitable storage facility) for the returned file, which is organized into one or more new quad nodes that are descendents of the parent quad node. Cache node manager 640 can also decrypt or decompress the data file returned from the GIS server(s), if necessary (e.g., to complement any encryption or compression on the server-side). Cache node manager 640 updates the parent quad node in quad node tree 634 with the address corresponding to the local memory 630 address for each newly constructed child quad node.

Separately and asynchronously in renderer module 650, upon its next traversal of quad node tree 634 and traversal of the updated parent quad node, renderer module 650 finds the address in local memory corresponding to the child quad node and can access the child quad node. The renderer's traversal of the child quad node progresses according to the same steps that are followed for the parent quad node. This continues through quad node tree 634 until a node is reached that is completely disjoint from view specification 632 or is considered inappropriate to draw based on other factors as previously explained.

In this particular embodiment, note that there is no communication between the cache node manager thread and renderer module 650 other than the renderer module's reading of the quad nodes written or otherwise provided by the cache node manager thread. Further note that, in this particular embodiment, cache nodes and thereby quad nodes continue to be downloaded until the children returned contain only payloads that are completely disjoint from view specification 632 or are otherwise unsuitable for drawing, as previously explained. Likewise, display interface 680 (e.g., a display interface card) is configured to allow data from renderer module 650 to be sent to a display associated with the user's computer, so that the user can view the data. Display interface 680 can be implemented with conventional technology.

Each of GIS client 600 and the GIS server may be implemented on any computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for navigating a virtual camera in a three-dimensional environment, wherein the virtual camera specifies a view of the three-dimensional environment, comprising:

determining, by one or more computing devices, a variation in altitude of content in the view of the three-dimensional environment specified by the virtual camera, wherein the view of the three-dimensional environment includes a plurality of nodes, each node describing a region of geographic data at a particular level of detail, wherein the determining the variation in altitude comprises:

for each of the plurality of nodes:
  (i) determining a variation in altitude in the region of the node;
  (ii) determining a weight for the node corresponding to the node's level of the detail such that variations in altitudes in nodes having greater detail are weighted more heavily than variations in altitudes in nodes having lesser detail;
  (iii) determining the variation in altitude of content in the view based on the respective weights and the respective variations in altitudes in the respective regions;
  (iv) determining an area of the region of the node, wherein determining an area of the region of the node comprises:
    (1) determining a variation in longitude in the region of the node;
    (2) determining a variation in latitude in the region of the node; and (3) determining the area of the region of the node based on the variation in longitude and the variation in latitude; and (v) determining a ratio of the variation in altitude determined in (i) to the area of the region of the node, and wherein the determining (iii) comprises determining the variation in altitude of content in the view based on the respective weights determined in (ii) and the respective ratios determined in (v);

wherein the variation in altitude of content in the view is a function of the weight for the node, the variation in altitude in the region of the node, the variation in latitude in the region of the node, and the variation in longitude in the region of the node;

determining, by the one or more computing devices, an adjusted tilt according to the variation in altitude; and changing, by the one or more computing devices, a tilt of the virtual camera based on the adjusted tilt.

2. The method of claim 1, wherein the variation in altitude of content in the view substantially satisfies an equation:

$$V = \frac{\sum_{n=0}^{N} w_n \left( \frac{Alt_n^{max} - Alt_n^{min}}{\sqrt{(Lat_n^{max} - Lat_n^{min})(Long_n^{max} - Long_n^{min})}} \right)}{\sum_{n=0}^{N} w_n},$$

wherein V is the variation in altitude of content in the view,
wherein $w_n$ is the weight for a node n,
wherein $Alt_n^{max} - Alt_n^{min}$ is the variation in altitude in the region of a node n,
wherein $Lat_n^{max} - Lat_n^{min}$ is the variation in latitude in the region of a node n,
wherein $Long_n^{max} - Long_n^{min}$ is the variation in longitude in the region of a node n, and
wherein {0 . . . N} consists of every node in the view.

3. The method of claim 1, wherein determining (i) comprises determining a height of a bounding box encompassing the geographic data in the region of the node.

4. The method of claim 1, wherein determining the adjusted tilt comprises:
determining a tilt factor such that:
(1) when the variation in altitude of the content in the view is less than a first threshold, the tilt factor is set to a first value,
(2) when the variation in altitude of the content in the view is greater than the first threshold and less than a second threshold, the tilt factor is between the first value and a second value and corresponds to the variation in altitude of the content in the view, and,
(3) when the variation in altitude of the content in the view is greater than the second threshold, the tilt factor is set to the second value, wherein the first value is less than the second value and the first threshold is less than the second threshold; and
(iii) adjusting a tilt of the virtual camera according the initial change in tilt and the tilt factor to determine the adjusted tilt.

5. A program storage device readable by one or more processors, tangibly embodying a program of instructions executable by the one or more processors to perform method steps for navigating a virtual camera in a three-dimensional environment, wherein the virtual camera specifies a view of the three-dimensional environment, said method steps comprising:

determining a variation in altitude of content in the view of the three-dimensional environment specified by the virtual camera;

determining an adjusted tilt according to variation in altitude such that the tilt approaches 90 degrees as the variation in altitude increases; and positioning the virtual camera at a second location in the three-dimensional environment such that the virtual camera and the adjusted tilt defines an angle relative to an upward vector from the target location, the adjusted tilt determined by, for each of a plurality of nodes defining the content in the view of the three-dimensional environment:

(i) determining a variation in altitude in the region of the node using a height of a bounding box encompassing the geographic data in the region of the node, (ii) determining a weight for the node corresponding to the node's level of the detail such that variations in altitudes in nodes having greater detail are weighted more heavily than variations in altitudes in nodes having lesser detail, (iii) determining the variation in altitude of content in the view based on the respective weights and the respective variations in altitudes in the respective regions;

(iv) determining an area of the region of the node;
(1) determining a variation in longitude in the region of the node;
(2) determining a variation in latitude in the region of the node; and
(3) determining the area of the region of the node based on the variation in longitude and the variation in latitude
and (v) determining a ratio of the variation in altitude determined in (i) to the area of the region of the node, and wherein the determining (iii) comprises determining the variation in altitude of content in the view based on the respective weights determined in (ii) and the respective ratios determined in (v);

wherein the variation in altitude of content in the view is a function of the weight for the node, the variation in altitude in the region of the node, the variation in latitude in the region of the node, and the variation in longitude in the region of the node.

6. The program storage device of claim 5, wherein the variation in altitude of content in the view substantially satisfies an equation:

$$V = \frac{\sum_{n=0}^{N} w_n \left( \frac{Alt_n^{max} - Alt_n^{min}}{\sqrt{(Lat_n^{max} - Lat_n^{min})(Long_n^{max} - Long_n^{min})}} \right)}{\sum_{n=0}^{N} w_n},$$

wherein V is the variation in altitude of content in the view,
wherein $w_n$ is the weight for a node n,
wherein $Alt_n^{max} - Alt_n^{min}$ is the variation in altitude in the region of a node n,
wherein $Lat_n^{max} - Lat_n^{min}$ is the variation in latitude in the region of a node n,
wherein $Long_n^{max} - Long_n^{min}$ is the variation in longitude in the region of a node n, and
wherein {0 . . . N} consists of every node in the view.

7. The program storage device of claim 5, wherein determining the adjusted tilt comprises:

determining a tilt factor such that:
(1) when the variation in altitude of the content in the view is less than a first threshold, the tilt factor is set to a first value,
(2) when the variation in altitude of the content in the view is greater than the first threshold and less than a second threshold, the tilt factor is between the first value and a second value and corresponds to the variation in altitude of the content in the view, and,
(3) when the variation in altitude of the content in the view is greater than the second threshold, the tilt factor is set to the second value, wherein the first value is less than the second value and the first threshold is less than the second threshold; and
(iii) adjusting a tilt of the virtual camera according the initial change in tilt and the tilt factor to determine the adjusted tilt.

8. A system for navigating a virtual camera in a three dimensional environment, wherein the virtual camera specifies a view of the three-dimensional environment, comprising:
an altitude variation module, implemented on the computing device, that, when activated, determines a variation in altitude of content in the view of the three-dimensional environment specified by the virtual camera, wherein the altitude variation module: (i) determines, for each of the plurality of nodes, a variation in altitude in the region of the node, (ii) determines, for each of the plurality of nodes, a weight for the node corresponding to the node's level of the detail such that variations in altitudes in nodes having greater detail are weighted more heavily than variations in altitudes in nodes having lesser detail, (iii) determines the variation in altitude of content in the view based on the respective weights and the respective variations in altitudes in the respective regions, and (iv) determines an area of the region of the node, (v) determines the variation in altitude of content in the view based on the respective weights and ratios of the respective variations in altitudes in the respective regions, the ratios being determined based on the respective variations in altitudes to the respective areas, and wherein the altitude variation module, for each of the plurality of nodes, determines a variation in longitude in the region of the node, determines a variation in latitude in the region of the node, and determines the area of the region of the node based on the variation in longitude and the variation in latitude, wherein the variation in altitude of content in the view is a function of the weight for the node, the variation in altitude in the region of the node, the variation in latitude in the region of the node, and the variation in longitude in the region of the node;
a tilt calculator module, implemented on the computing device, that, when activated:
determines an adjusted tilt according to the variation in altitude such that the tilt approaches 90 degrees as the variation in altitude increases;
a positioner module, implemented on the computing device, that, when activated, positions the virtual camera so that the adjusted tilt defines an angle relative to an upward vector from the target location; and
a controller module, implemented on the computing device, that activates the altitude variation module, the tilt calculator, and the positioner module.

9. The system of claim 8, wherein the variation in altitude of content in the view substantially satisfies an equation:

$$V = \frac{\sum_{n=0}^{N} w_n \left( \frac{Alt_n^{max} - Alt_n^{min}}{\sqrt{(Lat_n^{max} - Lat_n^{min})(Long_n^{max} - Long_n^{min})}} \right)}{\sum_{n=0}^{N} w_n},$$

wherein V is the variation in altitude of content in the view,
wherein $w_n$ is the weight for a node n,
wherein $Alt_n^{max} - Alt_n^{min}$ is the variation in altitude in the region of a node n,
wherein $Lat_n^{max} - Lat_n^{min}$ is the variation in latitude in the region of a node n,
wherein $Long_n^{max} - Long_n^{min}$ is the variation in longitude in the region of a node n, and
wherein $\{0 \ldots N\}$ consists of every node in the view.

10. The system of claim 8, wherein the altitude variation module, for respective nodes, determines a height of a bounding box encompassing the geographic data in the region of the node to determine the variation in altitude for the node.

11. The system of claim 8, wherein the tilt calculator module: determines a tilt factor such that (1) when the variation in altitude of the content in the view is less than a first threshold, the tilt factor is set to a first value, (2) when the variation in altitude of the content in the view is greater than the first threshold and less than a second threshold, the tilt factor is between the first value and a second value and corresponds to the variation in altitude of the content in the view, and, (3) when the variation in altitude of the content in the view is greater than the second threshold, the tilt factor is set to the second value, wherein the first value is less than the second value and the first threshold is less than the second threshold; and (iii) adjusts a tilt of the virtual camera according the initial change in tilt and the tilt factor to determine the adjusted tilt.

* * * * *